United States Patent [19]

Tuttle

[11] Patent Number: 5,646,592
[45] Date of Patent: Jul. 8, 1997

[54] ANTI-THEFT METHOD FOR DETECTING THE UNAUTHORIZED OPENING OF CONTAINERS AND BAGGAGE

[75] Inventor: John R. Tuttle, Corrales, N. Mex.

[73] Assignee: Micron Communications, Inc., Boise, Id.

[21] Appl. No.: 421,571

[22] Filed: Apr. 11, 1995

Related U.S. Application Data

[63] Continuation of Ser. No. 151,599, Nov. 12, 1993, Pat. No. 5,406,263, which is a continuation-in-part of Ser. No. 921,037, Jul. 27, 1992, abandoned.

[51] Int. Cl.⁶ .................................................. G08B 13/08
[52] U.S. Cl. ........................... 340/572; 340/541; 340/652
[58] Field of Search ................................... 340/540, 541, 340/542, 547, 572, 652

[56] References Cited

U.S. PATENT DOCUMENTS

| | | | |
|---|---|---|---|
| 3,426,166 | 2/1969 | Canceill | 340/547 |
| 4,117,468 | 9/1978 | Vasquez | 340/571 |
| 4,262,284 | 4/1981 | Stieff et al. | 340/542 |
| 4,684,929 | 8/1987 | Edwards et al. | 340/541 |
| 5,111,184 | 5/1992 | Heaton et al. | 340/550 |
| 5,126,719 | 6/1992 | De Sorbo | 340/571 |
| 5,169,188 | 12/1992 | Kupperman et al. | 340/572 |
| 5,189,396 | 2/1993 | Stobbe | 340/541 |
| 5,396,218 | 3/1995 | Olah | 340/572 |
| 5,406,263 | 4/1995 | Tuttle | 340/572 |

*Primary Examiner*—Glen Swann
*Attorney, Agent, or Firm*—David J. Paul; Robert J. Stern

[57] ABSTRACT

A simple trip-wire or magnetic circuit associated with a shipping container provides continuity, which is detected electrically. Simply, if continuity is disabled by a forced entry of the container, electrical detection means, such as a radio-frequency-identification (RFID) tag, will alert the owner or monitoring station. The trip-wire concept would require the replacing of a broken trip wire (resulting from forced entry), while the magnetic circuit concept can be reused repetitively. In a second embodiment, a magnetic circuit and the detection device (RFID tag) are embedded into the shipping article during manufacturing. The preferred detection device, an RFID tag, could also be a battery backed transceiver type on which a replaceable or rechargeable battery could be mounted on the inside of the shipping container during manufacturing. The RFID tag would communicate with an interrogator unit, which could be connected to a host computer. The interrogator and/or the host computer and/or other alarm devices would then monitor the shipping container's status (opened or closed).

15 Claims, 9 Drawing Sheets

ANTI-THEFT METHOD FOR DETECTING THE UNAUTHORIZED OPENING OF CONTAINERS AND BAGGAGE

CROSS-REFERENCE TO RELATED APPLICATION

This application is a continuation of U.S. patent application Ser. No. 08/151,599 filed Nov. 12, 1993, now U.S. Pat. No. 5,406,263 which is a continuation-in-part to U.S. Pat. application No. 07/921,037, filed Jul. 27, 1992, now abandoned.

FIELD OF THE INVENTION

This invention relates generally to anti-theft devices and in particular to a method for detecting unauthorized opening of containers and baggage.

BACKGROUND OF THE INVENTION

Protecting personal property has become a major industry from a security system standpoint. Security systems today can be as elaborate as those installed to protect banking institutions, equipped with video cameras, hooked-up as alarms to the local police station and security guards, or be as simple as a car alarm that is sounded when the door is forced open.

Likewise, the shipping industry is faced with an increasingly growing security problem in that containers, packages, baggage, luggage and mail (all of which may be referred to as simply "shipping container" hereinafter) are vulnerable to being opened by unauthorized personnel, who might steal the contents. As this problem increases it becomes necessary to protect these articles in order to protect the customer's property.

Due to the smaller size and larger quantity of the shipping articles mentioned above, the protection system used must be compact for concealment purposes, and somewhat simple in operation, thereby making them easy to produce and install in mass quantities while being fairly easy to monitor and operate.

The anti-theft method of the present invention conveniently addresses all of these issues to provide a workable and fairly inexpensive solution to securing safe transportation of articles shipped in some type of enclosed shipping container.

SUMMARY OF THE INVENTION

The present invention introduces a method for protecting against the unauthorized opening of shipping containers which is disclosed in the several embodiments following.

A first embodiment comprises a simple trip-wire or magnetic circuit that provides continuity, which is detected electrically. Simply, if continuity is disabled by a forced entry of the container, electrical detection means, such as a radio-frequency-identification (RFID) transceiver tag (or simply RFID tag), will alert the owner or monitoring station. The trip-wire concept would require the replacing of a broken trip wire (resulting from forced entry), while the magnetic circuit concept can be reused repetitively.

A second embodiment comprises the magnetic circuit approach of the first embodiment by having the magnetic circuit and the detection device embedded into the shipping article during manufacturing. The preferred detection device, and RFID tag, could also be a battery backed transceiver type on which a replaceable or rechargeable battery could be mounted on the inside of the shipping container during manufacturing. The RFID tag would communicate with an interrogator unit, which could be connected to a host computer. The interrogator and/or the host computer would then monitor the shipping container's status (opened or closed). The RFID tag could also have an output that changes state upon alarm, so that another device could be connected to indicate the alarm via sound, flashing lights or other means.

Implementation of the present invention will become readily understandable to one skilled in the art in the detailed descriptions that follow.

DETAILED DESCRIPTION OF THE PREFERRED EMBODIMENTS

Figure 1:
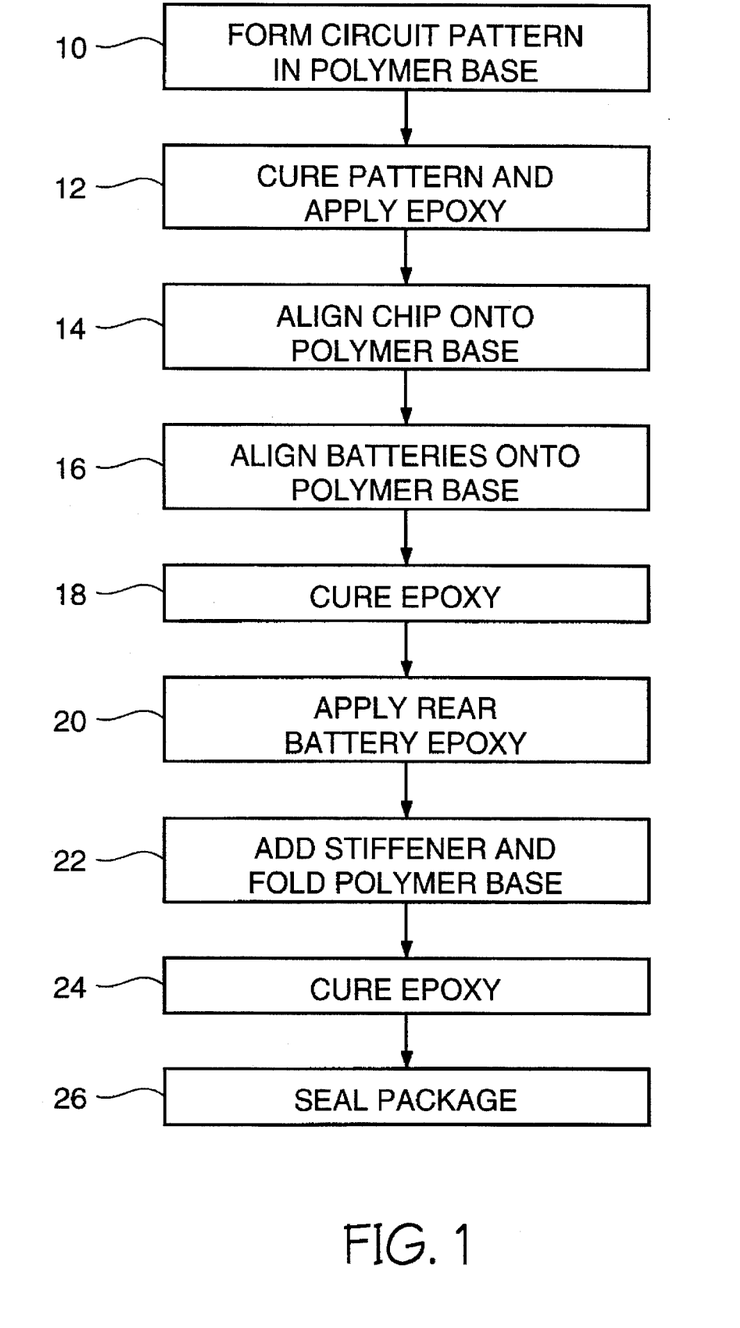
FIG. 1 is a process flow diagram showing the major processing stations and fabrication stages used in an overall manufacturing process of an RFID tag.

Referring now to FIG. 1, the process flow diagram shown in this figure includes nine (9) major processing stations or fabrication stages which are used in the overall manufacturing process steps that may be used to fabricate an RFID (radio frequency identification) tag unit used in the anti-theft method of the present invention. These stages are described in more detail below with reference to FIGS. 2 and 3A through 3E. Initially, a circuit pattern is formed on a polymer base material in station 10, whereafter the circuit pattern is cured and an epoxy conductive material is applied to station 12 before aligning an integrated circuit chip onto the polymer base in station 14. Next, batteries (batteries added to the RFID package is optional) are aligned onto the polymer base in station 16 whereafter the epoxy is cured in station 18.

In the next step, the rear battery epoxy is applied in station 20 before adding a stiffener and then folding the polymer base over onto the top cover as indicated in station 22. The epoxy material is then cured in station 24 before providing a final sealing step in stage 26 to complete the package as described in more detail below.

Figure 2:
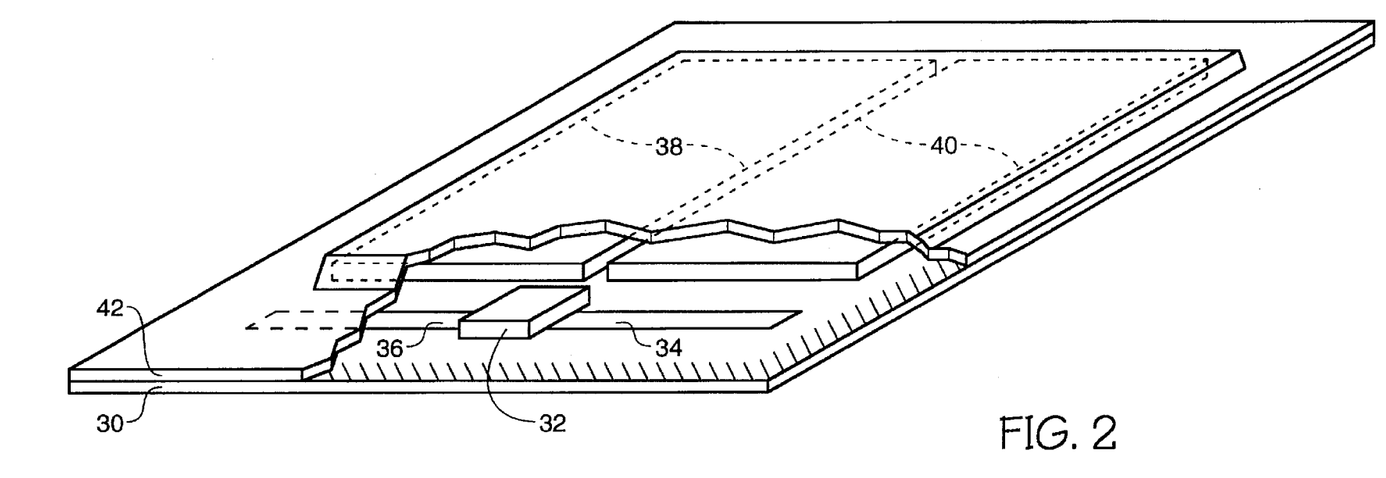
FIG. 2 is an enlarged perspective view of an RFID tag as constructed in accordance with the process flow of FIG. 1.

Referring now to FIG. 2, an RFID tag is depicted that includes a base support member 30 upon which an integrated circuit chip 32 is disposed on the near end of the device and connected to a dipole antenna consisting of metal strips 34 and 36 extending laterally from the chip 32 and typically screen printed on the upper surface of the base support member 30.

A pair of rectangular shaped batteries 38 and 40 are positioned as shown adjacent to the IC chip 32 and are also disposed on the upper surface of the base support member 30. The two rectangular batteries 38 and 40 are electrically connected in series to power the IC chip 32 in a manner more particularly described below. The device or package shown in FIG. 2 is then completed by the addition of an outer or upper cover member 42 which is sealed to the exposed edge surface portions of the base member 30 to thereby provide an hermetically sealed and completed package. The integrated chip 32 has transmitter, memory, logic, and receiver stages therein and is powered by the two batteries 38 and 40 during the transmission and reception of data to and from an interrogator to provide the interrogator with the various above identified information parameters concerning the article or person to which the RFID tag 30 is attached. The integrated chip may be designed to contain the needed circuitry one skilled in the art needs to accomplish the desired task and therefore may or may not contain all the circuitry listed above.

Figure 3A:
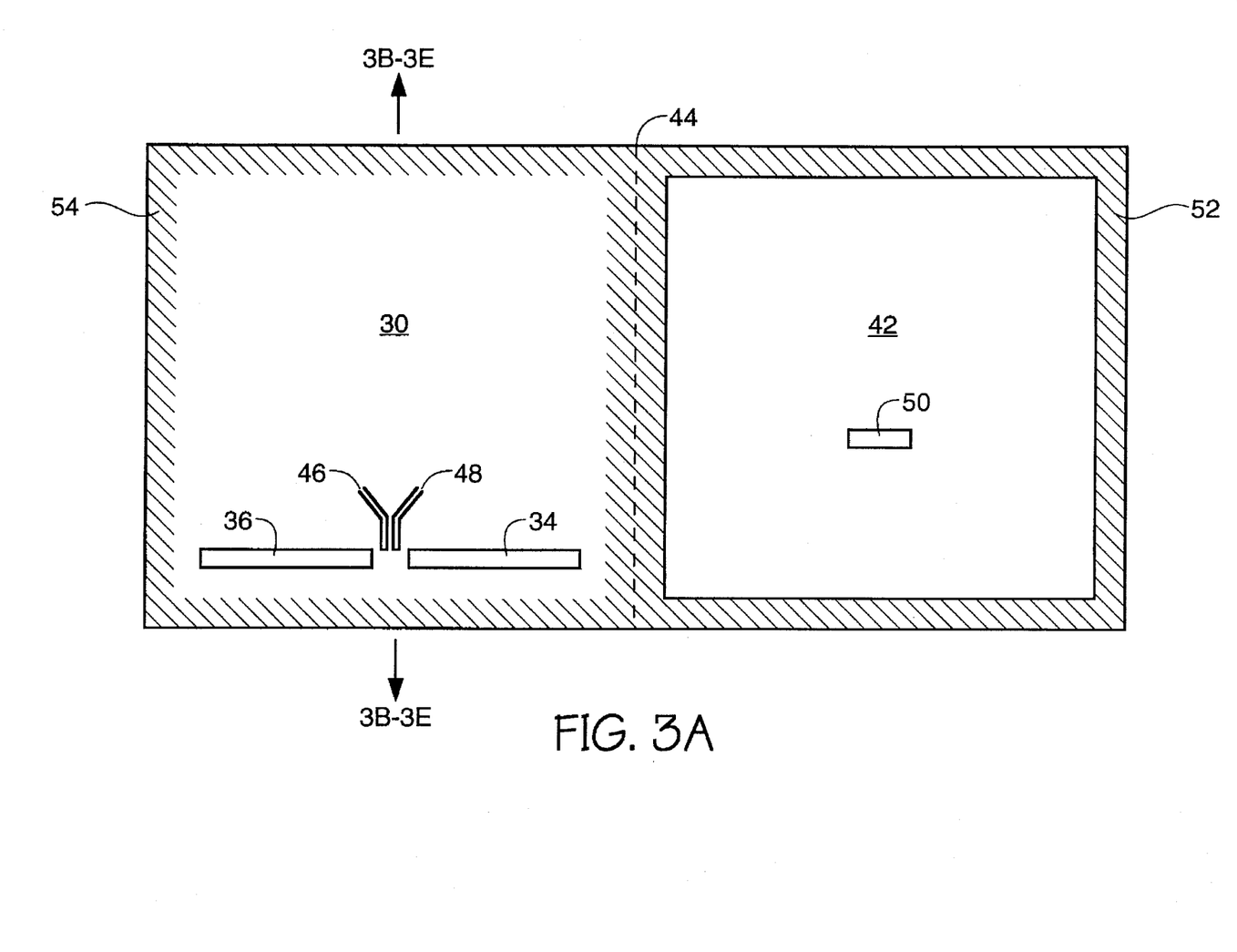
FIGS. 3A through 3E are cross sectional views of FIG. 2 showing the major processing steps used to construct the RFID tag.

Referring now to FIG. 3A, there is shown a plan view of the geometry of the base support member 30 and the cover member 42 which, during the initial manufacturing stage, are joined at an intersecting line 44. The dipole antenna strips 34 and 36 shown positioned on each side of the IC chip 32, and the two conductive strips 46 and 48 serve to connect the tops of the batteries 38 and 40 into the IC chip 32. A conductive strip 50 is provided on the upwardly facing inside surface of the top cover 42, so that when the cover 42 is folded by 180° C., its outer boundary 52 is ready to be sealed with the outer boundary 54 of the base support member 30, and simultaneously the conductive strip 50 completes the series electrical connection used to connect the two batteries 38 and 40 in series with each other and further in the series circuit with the integrated circuit chip 32 through the two conductors 46 and 48.

Referring now to FIGS. 3B through 3E, FIG. 3B shows in cross section the IC chip 32 bonded to the base support member 30 by means of a spot button of conductive epoxy material 56. The conductive strip 48 is shown in cross section on the upper surface of the base support member 30. This figure would correspond generally to the fabrication stations 10, 12, and 14 in FIG. 1.

Figures 3B, 3C, 3D:
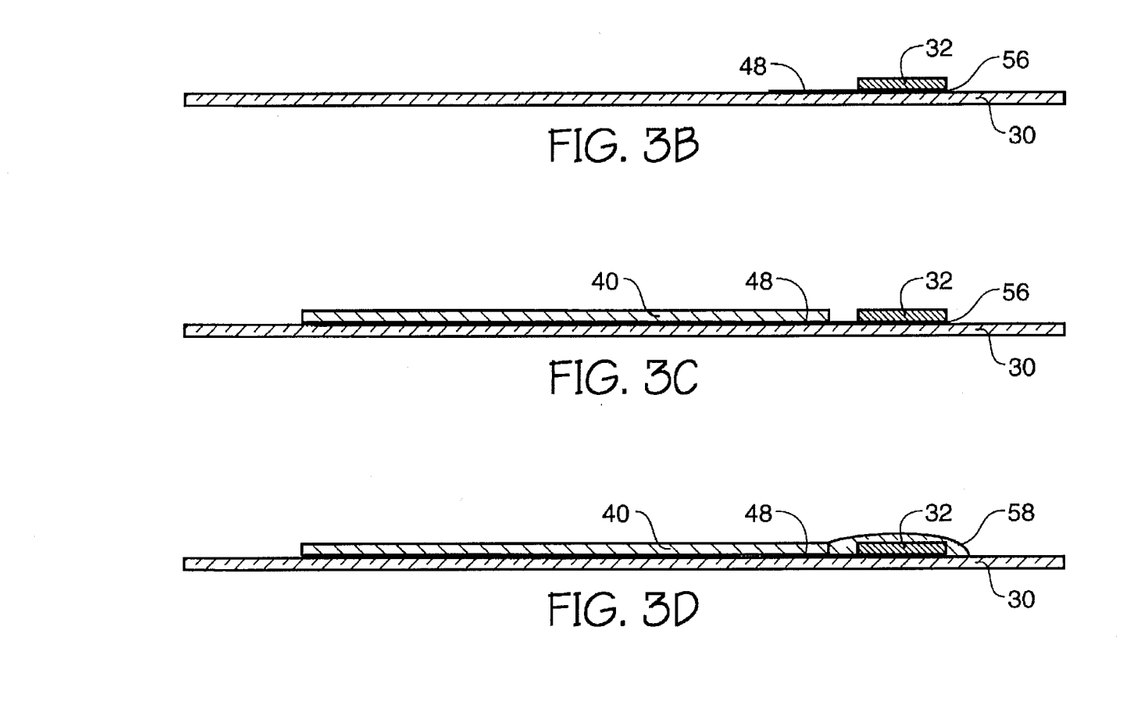

Referring now to FIG. 3C, the battery 40 is aligned in place as indicated earlier in FIG. 2 and has the right hand end thereof connected to the upper surface of the conductive strip 48. FIG. 3 would therefore correspond to stations 16 and 18 in FIG. 1.

Referring now to FIG. 3D, a stiffener material 58 is applied as shown over the upper and side surfaces of the IC chip 32, to provide a desired degree of stiffness to the package as completed. FIG. 3D would therefore correspond to stations 20 and 22 in FIG. 1.

Figure 3E:
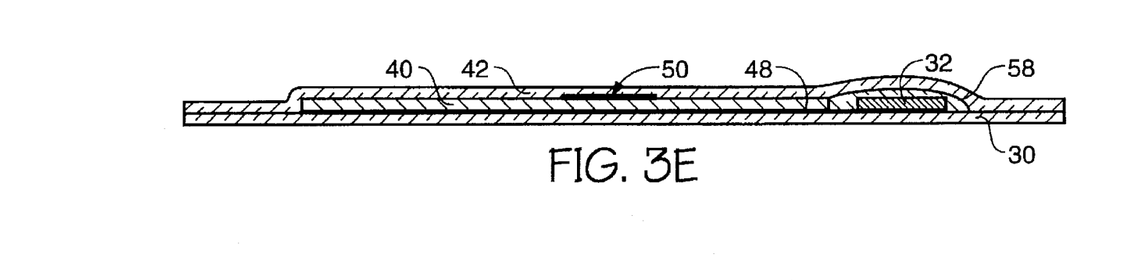

Next, a conductive epoxy is applied to the upper surfaces of the two batteries 38 and 40, and then the polymer base material 30 with the batteries thereon are folded over onto the cover member 42 to thus complete and seal the package in the configuration shown in FIG. 3E and corresponding to the remaining stations 24 and 26 in FIG. 1.

Figure 4:
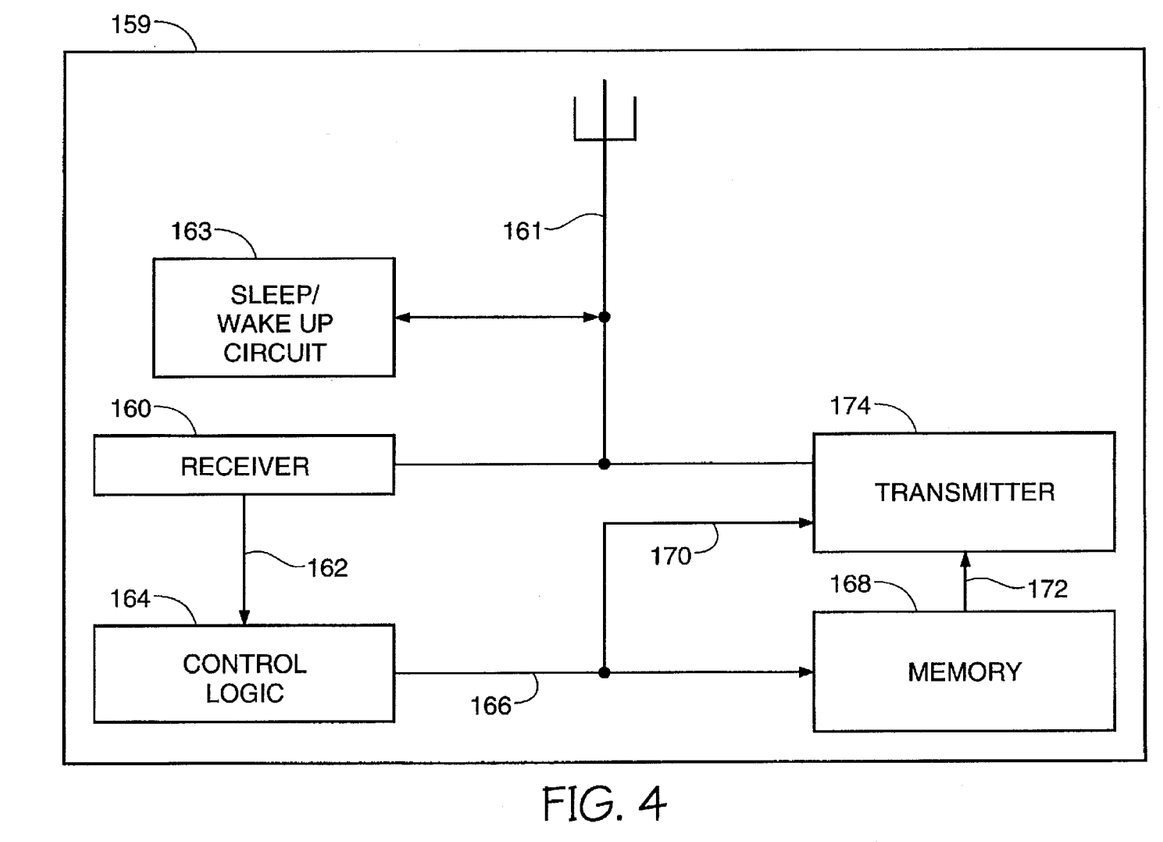
FIG. 4 is a functional block diagram showing the major signal processing stages within the RFID integrated circuit chip described herein and also within the interrogation unit used to interrogate the chip.

Referring now to FIG. 4, the rectangular outer boundary 159 in this figure defines the active area on the integrated circuit chip in which the integrated circuit transceiver has been formed using state of the art MOS planar processing techniques. These MOS planar processing techniques are well known in the art and are, therefore, not described in detail herein. Within the chip active area there is provided an RF receiver stage 160 which is connected to an antenna 161 and, via one or more lines or circuit connections 162, to a control logic stage 164. The control logic stage 164 is in turn connected via one or more integrated circuit connections or lines 166 to a memory stage 168. The control logic stage 164 is further connected via a line 170 to a transmitter stage 174, and the memory stage 168 is also connected via line 172 to the trasmitter stage 174. The memory stage 168 is operative to provide input data to the transmitter stage 174 upon request, and functions in a manner operationally described in the example given below.

Figure 5:
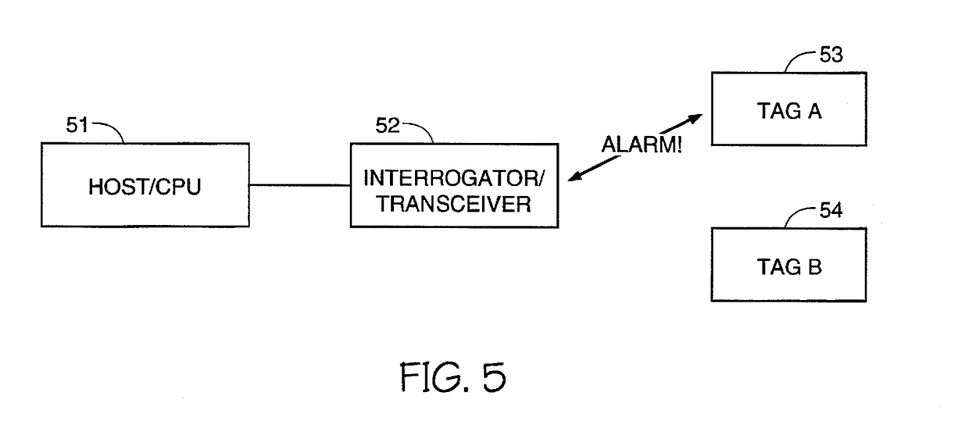
FIG. 5 is a functional block diagram showing the communication between several RFID tags and interrogation unit.

FIG. 5 is a functional block diagram showing a method of communication between several RFID tags and an interrogation unit used in the anti-theft detection units later described in FIGS. 6 and 7. Referring now to FIG. 5, Host/CPU 51 interacts with interrogator/transceiver unit 52 and instructs unit 52 to interrogate RFID tags A (53) and B (54) for alarm data. If interrogator 52 receives no reply from either tag A or tag B the host 51 continues to instruct unit 52 to interrogate tags A and B as often as internal software demands it. However, if tag A responds (in an alarm state) the interrogator unit 52 communicates that information to the host 51 and an appropriate alarm is sounded to notify personnel that unauthorized opening of a container has just taken place.

Figure 6:
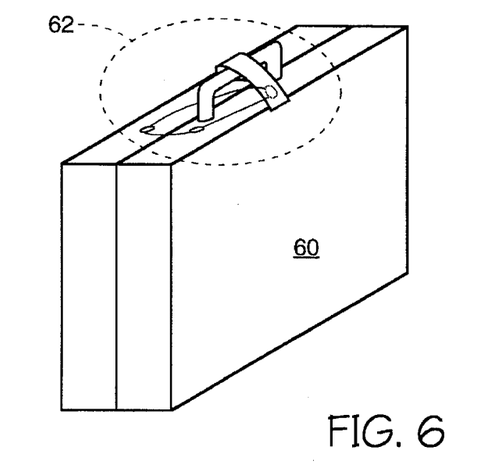
FIGS. 6, 6A and 6B depict a shipping container (luggage) on which a first embodiment of the present invention has been installed.
Figure 6A:
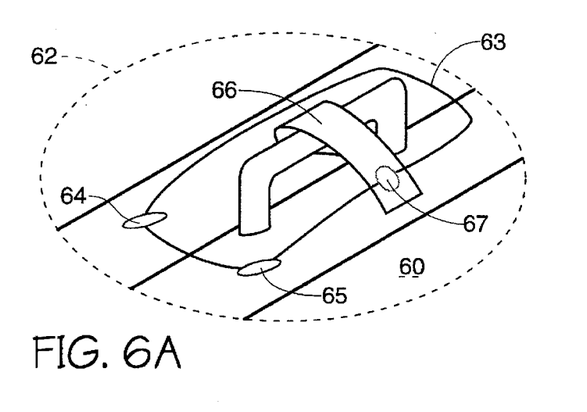
Figure 6B:
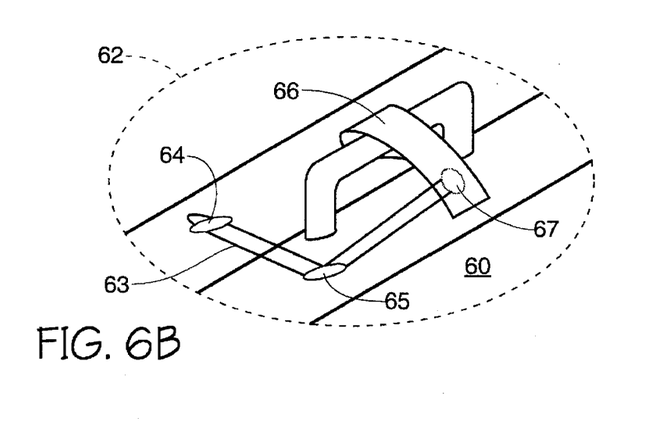

By using the communication approach taken in FIG. 5, a first embodiment of an "unauthorized opening detection device" is shown in FIG. 6 with variations of this embodiment shown in expanded views of FIG. 6 presented in FIGS. 6A and 6B.

Referring now FIG. 6, shipping container 60 (luggage in this case) is adorned with an "unauthorized opening detection unit" enclosed by outlined dashed circle 62. Expanded view 6A of dashed circle 62 shows a continuous wire 63 attached to both sides of container 60 at a first connection node 64, then to second connection node 65, continuing to RFID tag 67 (which is affixed to label 66) onto which wire 63 is attached. Wire 63 then completes its continuity path by attaching tag 67 to starting point node 64. If continuity is disrupted (wire 63 breaks by unauthorized opening of container 20) tag 67 would then signal the interrogator or some other device to sound an alarm and alert the owner or possibly security personnel in case of airline luggage transportation. Disarming the detection unit may be done by command from the interrogator or by the software at a given site, say at the container's destination, which may simply ignore the "opened" signal.

Expanded view of FIG. 6B shows a second means of installing a detection device wherein continuous wire 63 attaches to a first connection node 64, continues to a second connection node 65, routes to RFID tag 67 (which is affixed to label 66) and routes back to node 65 and finally to node 64.

Both attaching methods serve as examples of how the opening detection unit may be attached to containers or doors that open. It would be preferred to have the wire attached so that it is not easily detected by casual observance and not easily broken by accident. Tag 67 could be affixed to label 66 with tag 67 itself being adhered to a self-adhesive paper, such as stamp, and then applied to the label.

Figure 7:
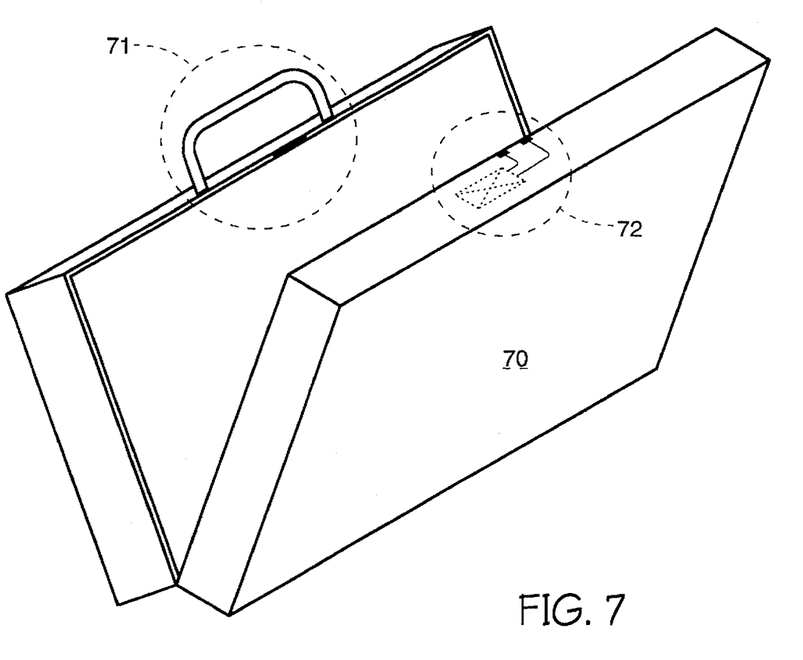
FIGS. 7, 7A and 7B depict a shipping container (luggage) on which a second embodiment of the present invention has been installed.
Figure 7A:
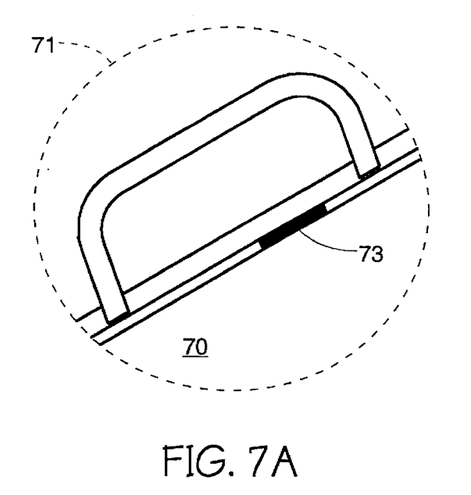
Figure 7B:
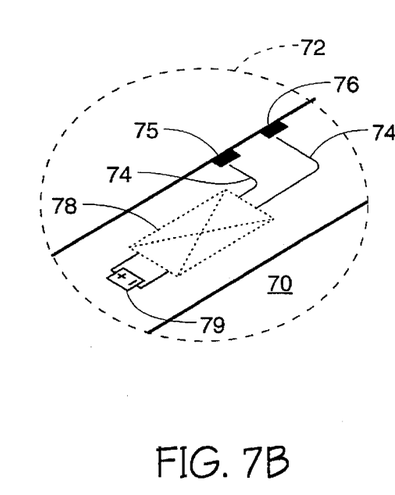

A second embodiment of an "unauthorized opening detection device" is shown in FIG. 7 with this embodiment shown in expanded views 7A and 2B.

Referring now to FIG. 7, shipping container 70 (luggage in this case) is adorned with an "unauthorized opening detection unit" enclosed by outlined dashed circles 71 and 72. In expanded view 7A of dashed circle 71, in the edge of container 70 a magnetic contact 73 is embedded. This magnetic contact 73 is preferably located in close proximity to a latch of container 70, or magnetic contact 73 may also function as half the latching mechanism to the container. In expanded view 7B of dashed circle 72, an RFID tag 78 is affixed to the top face of container 70. Electrical connections 74 extend from RFID tag 70 and attached to magnetic contacts 75 and 76. Magnetic contacts 75 and 76 may also function as the other half of the latching mechanism to the container. When container 70 is closed, contacts 75 and 76 mate with contact 73, thereby completing an electrical circuit. Unless disabled by the owner, should the container be forced open and continuity between contacts 73, 75 and 76 be disrupted, an alarm state bit is set in (in the alarm flagging circuitry) tag 78 which will signal the interrogator or other controlling device to sound an alarm to alert the owner or security personnel. Tag 78 will remain in an alarm state until the alarm state bit is reset by the interrogator/ controlling unit.

The detection device of FIG. 7A could be further enhanced by providing a replaceable battery 79, a power enabling means, for powering tag 78. It would be logical to have the battery only accessible from the inside of container 70 which would mean tag 78 would need to be embedded into container 70 and preferably embedded during the manufacturing of container 70. With a replaceable battery powered tag, tag 78 would now have the capability to send an alert signal to an interrogator unit or other device (such as a computer controlled transceiver unit) which would monitor the status of container 70 over its entire lifetime.

Figure 8:
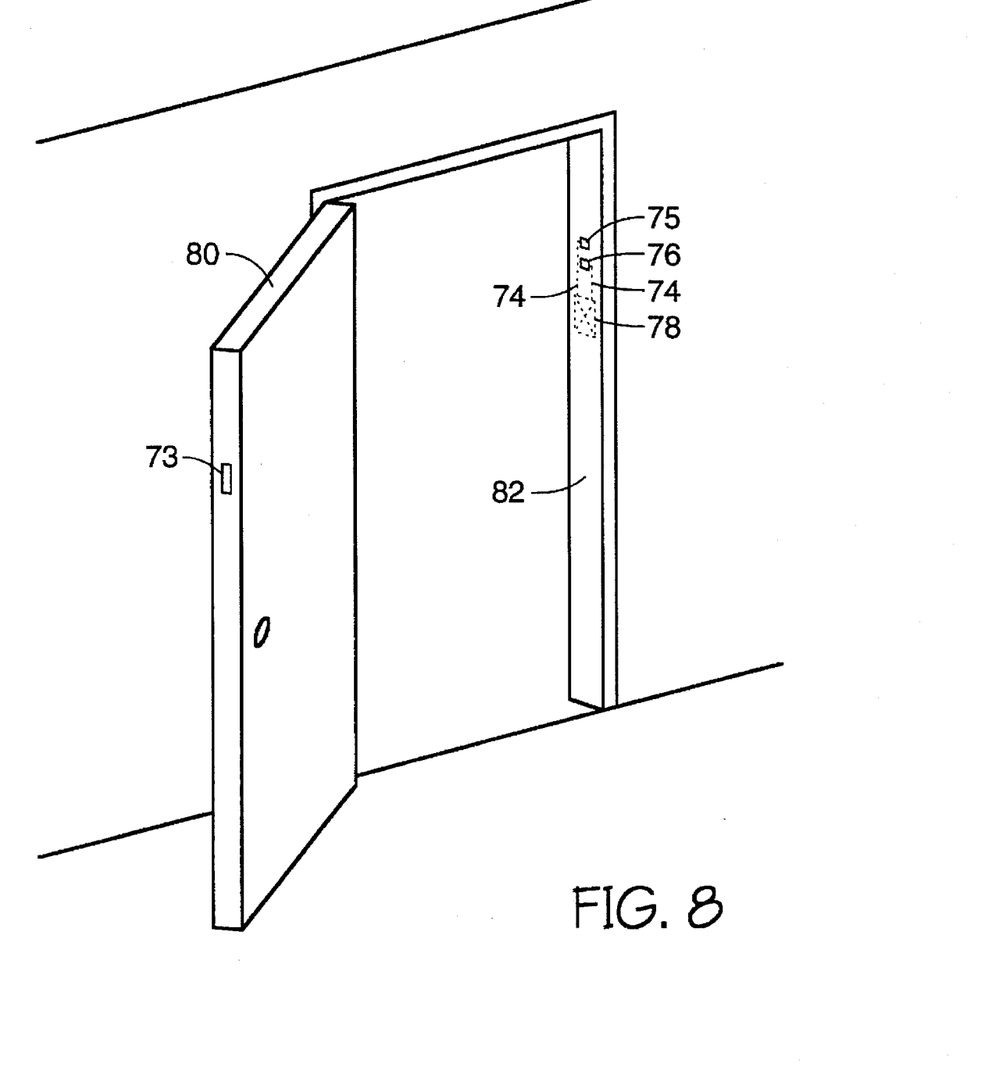
FIG. 8 depicts a door on which a first embodiment of the invention has been installed.

The methods of the embodiments discussed above, can easily be implemented into security systems. For example, as shown in FIG. 8, by attaching the RFID tag 78 and continuity completing circuitry 73, 74, 75, 76 to span between an entry/exit door 80 and the framework 82 supporting the door, unauthorized entry can now be monitored by activating the system when the door is to remain closed. Other such security schemes could also use the monitoring methods of the present invention.

It is to be understood that although the present invention has been described in several embodiments, various modifications known to those skilled in the art, such as applying these techniques to any kind of containers (mail, freight, etc.) or by various methods of attaching the detection device to the container, may be made without departing from the invention as recited in the several claims appended hereto.

I claim:

1. For an apparatus having an aperture which is selectably closed and opened by moving first and second members together and apart respectively, an improved security device for detecting whether the aperture is opened, comprising:
    (a) an elongated electrical conductor having first and second ends, the conductor extending between the two closure members and being attached to both the first closure member and the second closure member so that the two closure members cannot be moved apart a substantial amount to open the aperture without breaking the conductor; and
    (b) an RFID transceiver, connected to the two ends of the conductor, including an electrical circuit for detecting when electrical continuity between the two ends of the conductor is broken and subsequently transmitting an alarm signal, wherein the circuit of the RFID transceiver further includes:
        (i) an alarm flagging circuit which indicates either a "see" condition or a "reset" condition according to whether the electrical continuity between the two ends of the conductor has or has not been broken;
        (ii) a receiver circuit for receiving interrogation signals from an interrogator outside the RFID transceiver; and
        (iii) a transmitter circuit for transmitting an alarm signal to the interrogator if the receiver receives an alarm data interrogation signal from the interrogator while the alarm flagging circuit indicates the "see" condition.

2. A security device according to claim 1, wherein the transmitter circuit does not transmit any signal to the interrogator if the receiver receives an alarm data interrogation signal while the alarm flagging circuit indicates the "reset" condition.

3. For a container having an aperture which is selectably closed and opened by moving first and second external walls together and apart, respectively, an improved security device for detecting whether the aperture is opened, comprising:
    (a) an elongated electrical conductor having first and second ends, the conductor extending between the two container walls and being attached to both walls so that the two walls cannot be moved apart a substantial amount to open the aperture without breaking the conductor; and
    (b) an RFID transceiver, connected to the two ends of the conductor, including an electrical circuit for detecting when electrical continuity between the two ends of the conductor is broken and subsequently transmitting an alarm signal, wherein the RFID transceiver is embedded within a wall of the container, and wherein the RFID transceiver includes a replaceable battery which is mounted so as to be accessible only from the interior of the container.

4. For a suitcase bounded by first and second opposing, concave side members attached together by a hinge mounted on one end of each side member, the suitcase having an aperture which is selectably closed and opened by moving said first and second side members together and apart, respectively, an improved security device for detecting whether the aperture is opened, comprising:
    (a) an elongated electrical conductor having first and second ends, the conductor extending between the two side members and being attached to the two side members so that the two side members cannot be moved apart a substantial amount to open the aperture without breaking the conductor, the elongated conductor being attached to the first and second side members so as to extend between them at an end of each side member opposite the end on which the hinge is mounted; and
    (b) an RFID transceiver, connected to the two ends of the conductor, including an electrical circuit for detecting when electrical continuity between the two ends of the conductor is broken and subsequently transmitting an alarm signal.

5. For a suitcase having a handle on having an aperture which is selectably closed and opened by moving first and second external walls of the suitcase together and apart, respectively, an improved security device for detecting whether the aperture is opened, comprising:
    (a) an elongated electrical conductor having first and second ends, the conductor extending between the two walls and being attached to the two walls so that the two walls cannot be moved apart a substantial amount to open the aperture without breaking the conductor; and (b) an RFID transceiver, connected to the two ends of the conductor, including an electrical circuit for detecting when electrical continuity between the two ends of the conductor is broken and subsequently transmitting an alarm signal, wherein the RFID transceiver is mounted on a strap encircling and attached to the handle.

6. For a doorway apparatus having an aperture which is selectably closed and opened by moving a door and a door frame together and apart, respectively, an improved security device for detecting whether the aperture is opened, comprising:

(a) an elongated electrical conductor having first and second ends, the conductor extending between the door and the door frame and being attached to both the door and the frame so that the door and the frame cannot be moved apart a substantial amount to open the aperture without breaking the conductor; and (b) an RFID transceiver, connected to the two ends of the conductor, including an electrical circuit for detecting when electrical continuity between the two ends of the conductor is broken and subsequently transmitting an alarm signal.

7. For an apparatus having an aperture which is selectably closed and opened by moving first and second closure members together and apart, respectively, an improved security device for detecting whether aperture is opened, comprising:

(a) an electrical device, mounted on the apparatus adjacent the aperture, for detecting whether the aperture is open or closed, wherein the electrical device includes:
 (i) first and second magnetic contacts mounted on the first closure member, and
 (ii) a third magnetic contact mounted on the second closure member at a position such that, when the two closure members are moved together so as to close the aperture, the third magnetic contact mates with both the first and the second contacts; and (b) an RFID transceiver which transmits an alarm signal after said device detects the aperture been opened.

8. A security device according to claim 7, wherein:

(a) said apparatus is a suitcase bounded by first and second opposing, concave side members attached together by a hinge mounted on one end of each side member, the first and second side members being the first and second closure members, respectively;

(b) the first and second magnetic contacts are mounted at an end of the first side member opposite the end on which the hinge is mounted; and (c) the third magnetic contact is mounted at an end of the second side member opposite the end on which the hinge is mounted.

9. A security device according to claim 7, wherein first and second electrical connections extend from the RFID transceiver to the first and second magnetic contacts, respectively, and wherein the third magnetic contact completes an electrical circuit between the first and second magnetic contacts upon mating with the first and second magnetic contacts.

10. For an apparatus having an aperture which is selectably closed and opened by moving first and second closure members together and apart, respectively, an improved security device for detecting whether the aperture is opened, comprising:

(a) an electrical device, mounted on the apparatus adjacent the aperture, for detecting whether the aperture is open or closed; and (b) an RFID transceiver which transmits an alarm signal after said device detects the aperture has been opened, wherein the RFID transceiver includes:
 (i) an alarm flagging circuit which indicates either a "see" condition or a "reset" condition according to whether the electrical device detects the aperture has or has not been opened;
 (ii) a receiver circuit for receiving interrogation signals from an interrogator outside the RFID transceiver, and
 (iii) a transmitter circuit for transmitting an alarm signal to the interrogator if the receiver receives an alarm data interrogation signal from the interrogator while the alarm flagging circuit indicates the "set" condition.

11. A security device according to claim 10, wherein the transmitter circuit does not transmit any signal to the interrogator of the receiver receives an alarm data interrogation signal while the alarm flagging circuit indicates the "reset" condition.

12. For a container apparatus having an aperture which is selectably closed and opened by moving first and second external walls of the container together and apart, respectively, an improved security device for detecting whether the aperture is opened, comprising:

(a) an electrical device, mounted on the apparatus adjacent the aperture, for detecting whether the aperture is open or closed; and (b) an RFID transceiver, embedded within a wall of the container, which transmits an alarm signal after said device detects the aperture has been opened, wherein the RFID transceiver includes a replaceable battery which is mounted so as to be accessible only from the interior of the container.

13. For a suitcase having a handle and having an aperture which is selectably closed and opened by moving first and second external walls of the suitcase together and apart, respectively, an improved security device for detecting whether the aperture is opened, comprising:

(a) an electrical device mounted on the suitcase adjacent the aperture, for detecting whether the aperture is open or closed; and (b) an RFID transceiver mounted on a strap encircling and attached to the handle which transmits an alarm signal after said device detects the aperture has been opened.

14. For a doorway apparatus having an aperture which is selectably closed and opened by moving a door and a door frame together and apart, respectively, an improved security device for detecting whether the aperture is opened, comprising:

(a) an electrical device, mounted on the doorway apparatus adjacent the aperture, for detecting whether the aperture is open or closed; and (b) an RFID transceiver which transmits an alarm signal after said device detects the aperture has been opened.

15. For an apparatus having an aperture which is selectably closed and opened by moving first and second closure members together and apart, respectively, an improved security device for detecting whether the aperture is opened, comprising:

(a) an electrical device, mounted on the apparatus adjacent the aperture, for detecting whether the aperture is open or closed, wherein the electrical device includes:

(i) first and second electrical contacts mounted on the first closure member, and (ii) a third electrical contact mounted on the second closure member at a position such that, when the two closure members are moved together so as to close the aperture, the third magnetic contact mates with both the first and the second contacts so as to complete an electrical circuit between the first and second contacts; and (b) an RFID transceiver which transmits an alarm signal after said device detects the aperture has been opened.

* * * * *

UNITED STATES PATENT AND TRADEMARK OFFICE
CERTIFICATE OF CORRECTION

PATENT NO : 5,646,592
DATED : Jul. 8, 1997
INVENTOR(S) : John R. Tuttle

It is certified that error appears in the above-identified patent and that said Letters Patent is hereby corrected as shown below:

Column 6, line 4 and line 13, change "see" to --set--; line 61, change "on" to --and--.
Column 8, line 8, change "see" to --set--.
Column 9, line 6, change "magnetic" to --electrical--.

Signed and Sealed this

Third Day of November, 1998

BRUCE LEHMAN

Attest:

Attesting Officer

Commissioner of Patents and Trademarks